(12) United States Patent
Isono

(10) Patent No.: US 11,383,717 B2
(45) Date of Patent: Jul. 12, 2022

(54) BRAKING/DRIVING FORCE CONTROL APPARATUS FOR A VEHICLE

(71) Applicant: Toyota Jidosha Kabushiki Kaisha, Toyota (JP)

(72) Inventor: Hiroshi Isono, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/192,010

(22) Filed: Mar. 4, 2021

(65) Prior Publication Data
US 2021/0284169 A1  Sep. 16, 2021

(30) Foreign Application Priority Data

Mar. 10, 2020 (JP) ............................. JP2020-040908

(51) Int. Cl.
| | |
|---|---|
| *B60W 30/18* | (2012.01) |
| *B60T 7/04* | (2006.01) |
| *B60K 26/02* | (2006.01) |
| *B60W 10/04* | (2006.01) |
| *B60W 10/18* | (2012.01) |

(52) U.S. Cl.
CPC ....... *B60W 30/18181* (2013.01); *B60K 26/02* (2013.01); *B60T 7/042* (2013.01); *B60W 10/04* (2013.01); *B60W 10/18* (2013.01); *B60W 2540/10* (2013.01); *B60W 2540/12* (2013.01); *B60W 2710/00* (2013.01); *B60W 2710/18* (2013.01)

(58) Field of Classification Search
USPC ................................................. 477/199, 200
See application file for complete search history.

(56) References Cited

U.S. PATENT DOCUMENTS

| | | | |
|---|---|---|---|
| 6,554,744 B2* | 4/2003 | Schmidt ........... | B60W 30/18118 477/200 |
| 6,565,482 B2* | 5/2003 | Kobayashi ........ | B60W 30/1819 477/79 |
| 9,840,243 B2* | 12/2017 | Saito ......................... | G05G 7/04 |
| 11,169,559 B2* | 11/2021 | Isono ..................... | B60T 11/18 |
| 2012/0240717 A1* | 9/2012 | Isono ..................... | B60T 11/18 74/520 |
| 2021/0232172 A1* | 7/2021 | Isono ..................... | B60K 26/02 |

FOREIGN PATENT DOCUMENTS

| | | | | |
|---|---|---|---|---|
| JP | 2001290547 A | * | 10/2001 | |
| JP | 2001290548 A | * | 10/2001 | |
| JP | 2019-068625 A | | 4/2019 | |
| WO | WO-2013069108 A1 | * | 5/2013 | ................ B60T 7/06 |

* cited by examiner

*Primary Examiner* — Dirk Wright
(74) *Attorney, Agent, or Firm* — Dinsmore & Shohl LLP

(57) ABSTRACT

A pedal device includes a first link, a second link, and a return spring that biases the first link toward a standard position at which a pivot angle of the first link is zero. A ratio of a pivot angle of the second link to the pivot angle of the first link is maximum when the pivot angle of the first link is a reference angle. A target acceleration/deceleration of a vehicle is calculated so that in the range in which the pivot angle of the first link is smaller than the reference angle, a target deceleration of the vehicle increases as the pivot angle of the first link is smaller, and in the range in which the pivot angle of the first link is larger than the reference angle, a target acceleration of the vehicle increases as the pivot angle of the first link increases.

10 Claims, 7 Drawing Sheets

BRAKING/DRIVING FORCE CONTROL APPARATUS FOR A VEHICLE

CROSS-REFERENCE TO RELATED APPLICATION

This application claims priority to Japanese Patent Application No. JP2020-040908 filed on Mar. 10, 2020, the content of which is hereby incorporated by reference in its entirety into this application.

BACKGROUND

1. Technical Field

The present disclosure relates to a braking/driving force control apparatus for a vehicle such as an automobile.

2. Description of the Related Art

In vehicles such as automobiles, there is known a so-called one-pedal type pedal device that is operated by a driver to control a braking force and a driving force of the vehicle. In a braking/driving force control apparatus for a vehicle including a one-pedal type pedal device, a control unit calculates a target acceleration/deceleration of the vehicle according to an amount of depression of the pedal device, and controls a braking/driving force generating device so that acceleration/deceleration of the vehicle becomes the target acceleration/deceleration.

For example, in Japanese Patent Application Laid-open No. 2019-068625, a pendant type pedal device having a pedal link pivotably supported at an upper end and depressed at a lower end by a driver, and a return spring for generating a return torque for urging the pedal link to a standard position is described. When a depressing amount is smaller than a neutral position, a target deceleration of the vehicle is calculated such that the smaller the depression amount is, the larger the target deceleration is. On the other hand, when the depression amount is larger than the neutral position, a target acceleration of the vehicle is calculated such that the larger the depression amount is, the larger the target acceleration is.

Therefore, the driver can control the acceleration/deceleration of the vehicle to zero by maintaining the depression amount at the neutral position. Further, the driver can control the deceleration of the vehicle by controlling the depression amount in a braking range smaller than the neutral position, and can control the acceleration of the vehicle by controlling the depression amount in an acceleration range larger than the neutral position.

Generally, in a one-pedal type pedal device, it may be that a ratio of a change amount of a deceleration of a vehicle to a change amount of a pedal stroke increases as the pedal stroke decreases. Further, it may be that a ratio of a change amount of an acceleration of the vehicle to a change amount of the pedal stroke increases as the pedal stroke increases. Therefore, a ratio of a change amount of a target deceleration of the vehicle to the change amount of the pedal stroke is set to increase as the pedal stroke decreases. Further, a ratio of a change amount of a target acceleration of the vehicle to a change amount of the pedal stroke is set to increase as the pedal stroke increases.

On the other hand, it may be that a ratio of the change amount of the acceleration/deceleration of the vehicle to a change amount of a pedal reaction force is constant regardless of whether the pedal stroke is in a braking range or an acceleration range. That is, regardless of whether a driver performs braking or acceleration, it may be that the acceleration/deceleration of the vehicle linearly increase or decrease at a constant rate with respect to the increase or decrease of the pedal reaction force.

Generally, the return spring is a linear spring, such as a tension coil spring, so that a return torque increases substantially linearly as the pedal stroke of the pedal device increases. Therefore, when the change amount of the target acceleration/deceleration of the vehicle with respect to the change amount of the pedal stroke is set to have the characteristic as described above, the acceleration/deceleration of the vehicle cannot be linearly increased/decreased with respect to the increase/decrease of the pedal reaction force.

Conversely, if the acceleration/deceleration of the vehicle is to be linearly increased or decreased at a constant rate with respect to the increase or decrease of the pedal reaction force, the ratio of the change amount of the target acceleration/deceleration of the vehicle to the change amount of the pedal stroke cannot be set to the ratio described above. Therefore, not only the change amount of the acceleration/deceleration of the vehicle cannot be changed with respect to the change amount of the pedal stroke, but it becomes difficult for the driver to recognize the neutral position between the braking range and the acceleration range of the pedal stroke by changing the acceleration/deceleration of the vehicle.

SUMMARY

The present disclosure provides a braking/driving force control apparatus for a vehicle that is improved so that a change amount of an acceleration/deceleration of the vehicle may be changed with respect to a change amount of a pedal stroke, and the acceleration/deceleration of the vehicle is increased/decreased as linearly as possible with respect to an increase/decrease of a pedal reaction force.

According to the present disclosure, a braking/driving force control apparatus for a vehicle is provided which includes a pedal device having an input member depressed by a driver and a detection device configured to detect a depressing amount applied to the input member, and an electronic control unit that is configured to calculate a target acceleration/deceleration of the vehicle based on the depressing amount detected by the detection device, and control a braking/driving force generation device so that an acceleration/deceleration of the vehicle becomes the target acceleration/deceleration.

The pedal device includes a first link pivotably supported by a support member so as to be pivotable about a first axis and functioning as the input member, a second link supported pivotably about a second axis by the support member, a third link that is configured to pivot the second link about the second axis by transmitting force and displacement between the first link and the second link, and a return spring that generates a return torque about the first axis that biases the first link toward a standard position at which a pivot angle of the first link is zero, and is configured such that a ratio of a pivot angle of the second link to the pivot angle of the first link is maximum when the pivot angle of the first link is a preset reference angle.

The return spring is a tension spring that is connected at one end to one of the first link and the support member and is connected at the other end to the second link at a position spaced from the second axis. The electronic control unit is configured to calculate a target acceleration/deceleration of the vehicle according to the pivot angle of the first link, so that when the pivot angle of the first link is the reference angle, the target acceleration/deceleration of the vehicle is zero; in a range in which the pivot angle of the first link is smaller than the reference angle, the target deceleration of the vehicle increases as the pivot angle of the first link decreases; and in a range where the pivot angle of the first link is larger than the reference angle, the target acceleration of the vehicle increases as the pivot angle of the first link increases.

According to the above configuration, a target acceleration/deceleration of the vehicle is calculated according to the pivot angle of the first link so that the target acceleration/deceleration of the vehicle is zero when the pivot angle of the first link is the preset reference angle; in the range where the pivot angle of the first link is smaller than the reference angle, the smaller the pivot angle of the first link is, the larger the target deceleration of the vehicle is; and in the range where the pivot angle of the first link is larger than the reference angle, the larger the pivot angle of the first link is, the larger the target acceleration of the vehicle is.

A acceleration/deceleration of the vehicle is controlled so that it becomes the target acceleration/deceleration. Therefore, the acceleration/deceleration of the vehicle is controlled according to the pivot angle of the first link so that the acceleration/deceleration of the vehicle is zero when the pivot angle of the first link is the preset reference angle; in the range where the pivot angle of the first link is smaller than the reference angle, the smaller the pivot angle of the first link is, the larger the deceleration of the vehicle is; and in the range where the pivot angle of the first link is larger than the reference angle, the larger the pivot angle of the first link is, the larger the acceleration of the vehicle is.

Further, according to the above configuration, the pedal device includes the first to third links and the return spring, and the ratio of the pivot angle of the second link to the pivot angle of the first link is maximum when the pivot angle of the first link is the reference angle. Therefore, even if the pivot angle of the first link increases at a constant increase rate, in the process in which the pivot angle of the first link increases in a range smaller than the reference angle, the increase rate of the pivot angle of the second link increases as the pivot angle of the first link increases. Conversely, even if the pivot angle of the first link increases at a constant rate of increase, in the process in which the pivot angle of the first link increases in a range larger than the reference angle, the increase rate of the pivot angle of the second link decreases as the pivot angle of the first link increases.

The return spring is a tension spring, and is connected at one end to one of the first link and the support member and at the other end to the second link at a position spaced from the second axis. Therefore, the return torque generated by the return spring changes non-linearly according to the change in the pivot angle of the first link.

That is, even if the pivot angle of the first link increases at a constant increase rate, in the process in which the pivot angle of the first link increases in the range smaller than the reference angle, the increase rate of the return torque decreases as the pivot angle of the first link increases. Conversely, even if the pivot angle of the first link increases at a constant increase rate in the range in which the pivot angle of the first link is larger than the reference angle, the increase rate of the return torque increases as the pivot angle of the first link increases.

Therefore, as will be described in detail later, as compared with a conventional pedal device in which an increase rate of the return torque changes substantially linearly according to the change in the pivot angle of the first link, the relationship between the return torque and the acceleration/deceleration of the vehicle, and thus the relationship between the reaction force of the pedal device and the acceleration/deceleration of the vehicle can be approximated to a linear relationship. Accordingly, the acceleration/deceleration of the vehicle can be linearly increased/decreased as the reaction force of the pedal device is increased/decreased.

In one aspect of the present disclosure, the pedal device is configured such that as the pivot angle of the first link deviates from the reference angle, a ratio of a change amount of the pivot angle of the second link to a change amount of the pivot angle of the first link becomes larger, and the electronic control unit is configured to calculate the target acceleration/deceleration of the vehicle according to the pivot angle of the first link such that as the pivot angle of the first link decreases in a range smaller than the reference angle, a ratio of a change amount of the target deceleration of the vehicle to a change amount of the pivot angle of the first link increases, and as the pivot angle of the first link increases in a range larger than the reference angle, a ratio of a change amount of the target acceleration of the vehicle to a change amount of the pivot angle of the first link increases.

As described above, in the one-pedal type pedal device, it may be that a ratio of the change amount of the deceleration of the vehicle to the change amount of the pedal stroke increases as the pedal stroke decreases. Further, it may be that a ratio of the change amount of the acceleration of the vehicle to the change amount of the pedal stroke increases as the pedal stroke increases.

According to the above aspect, as the pivot angle of the first link deviates from the reference angle, the ratio of the change amount of the pivot angle of the second link to the change amount of the pivot angle of the first link increases. Further, a target acceleration/deceleration of the vehicle is calculated according to the pivot angle of the first link such that as the pivot angle of the first link decreases in the range smaller than the reference angle, the ratio of the change amount of the target deceleration of the vehicle to the change amount of the pivot angle of the first link increases, and as the pivot angle of the first link increases in the range larger than the reference angle, the ratio of the change amount of the target acceleration of the vehicle to the change amount of the pivot angle of the first link increases.

Therefore, in the range in which the pivot angle of the first link is smaller than the reference angle, the smaller the pivot angle of the first link, the ratio of the change amount of the target deceleration of the vehicle to the change amount of the pivot angle of the first link can be set so that the smaller the pivot angle of the first link is, the larger the ratio becomes. Further, in a range in which the pivot angle of the first link is larger than the reference angle, the ratio of the change amount of the target acceleration of the vehicle to the change amount of the pivot angle of the first link can be set so that the larger the pivot angle of the first link is, the larger the ratio becomes.

In another aspect of the present disclosure, the return spring is configured to generate a return torque that changes according to the pivot angles of the first and second links such that a ratio of a change amount of the deceleration of the vehicle to a change amount of a reaction force of the pedal device becomes constant, and a ratio of a change amount of the acceleration of the vehicle to a change amount of the reaction force of the pedal device becomes constant.

According to the above aspect, a return torque that changes according to the pivot angles of the first and second links is generated such that the ratio of the change amount of the deceleration of the vehicle to the change amount of the reaction force of the pedal device becomes constant, and the ratio of the change amount of the acceleration of the vehicle to the change amount of the reaction force of the pedal device becomes constant. Therefore, the relationship between the acceleration/deceleration of the vehicle and the reaction force of the pedal device can be made linear, and the acceleration/deceleration of the vehicle can be linearly increased/decreased in accordance with the increase/decrease of the reaction force of the pedal device.

Further, in another aspect of the present disclosure, the detection device is configured to detect the pivot angle of the second link about the second axis, and the electronic control unit is configured to determine the pivot angle of the first link about the first axis based on the pivot angle of the second link.

According to the above aspect, since the pivot angles of the first and second links have a fixed relationship, the pivot angle of the first link can be determined by detecting the pivot angle of the second link. Further, since it is not necessary to detect the pivot angle of the first link, it is possible to simplify the structure around the first link that is depressed by the driver.

Further, in another aspect of the present disclosure, the reference angle is larger than ¼ of a maximum pivot angle of the first link and smaller than ½ of the maximum pivot angle of the first link.

Generally, in the one-pedal type pedal device, it may be that a ratio of the braking range to the entire range of a pedal stroke is smaller than a ratio of the acceleration range to the entire range of the pedal stroke.

According to the above aspect, since the reference angle is larger than ¼ and smaller than ½ of the maximum pivot angle of the first link, the ratio of the braking range to the entire range of the pedal stroke can be larger than ¼ and smaller than ½.

Further, in another aspect of the present disclosure, the pedal device is configured such that a ratio of the pivot angle of the second link to the pivot angle of the first link is larger than 1.

According to the above aspect, the ratio of the pivot angle of the second link to the pivot angle of the first link is larger than 1. Therefore, a tensile force of the return spring increases as the pivot angle of the first link increases, so that a return torque for returning the first link to the standard position can be increased.

Further, in another aspect of the present disclosure, the third link is a connection link that is connected at one end to the first link pivotably about a third axis and is connected at the other end to the second link pivotably about a fourth axis.

According to the above aspect, the third link is the connecting link pivotably connected to the first link at one end and pivotably connected to the second link at the other end. Therefore, force and displacement can be transmitted between the first link and the second link by the connecting link, which enables the second link to pivot about the second axis in a direction opposite to that of the first link.

Further, in another aspect of the present disclosure, the first to fourth axes are parallel to each other, and the pedal device is configured such that, with a first intersection point being defined as an intersection point between a straight line connecting the first and second axes and a straight line connecting the third and fourth axes as viewed in a direction along the first to fourth axes, a distance between the first intersection and the first axis is maximum when the pivot angle of the first link is the reference angle.

According to the above aspect, as viewed in a direction along the first to fourth axes parallel to each other, the distance between the first axis and the first intersection point that is the intersection point between the straight line connecting the first and second axes and the straight line connecting the third and fourth axes is maximum when the pivot angle of the first link is the reference angle.

Therefore, as will be described in detail later, when the pivot angle of the first link is the reference angle, the ratio of the pivot angle of the second link to the pivot angle of the first link can be maximized. Further, as the pivot angle of the first link deviates from the reference angle, the ratio of the change amount of the pivot angle of the second link to the change amount of the pivot angle of the first link can be increased.

Further, in another aspect of the present disclosure, the third link includes a roller supported by the second link rotatably about a fifth axis parallel to the second axis and a roller contact surface provided on the first link, and the roller is configured to roll in contact with the roller contact surface when the first link pivots about the first axis.

According to the above aspect, when the first link pivots about the first axis, the roller supported by the second link rotatably about the fifth axis parallel to the second axis rolls in contact with the roller contact surface provided on the first link. Therefore, force and displacement can be transmitted between the first link and the second link by the cooperation of the roller and the roller contact surface, and the second link can be pivoted about the second axis in a direction opposite to that of the first link.

Further, in another aspect of the present disclosure, the first and fifth axes are parallel to each other, and the pedal device is configured such that, with a second intersection point being defined as an intersection of a straight line connecting the first and second axes and a straight line connecting a contact point of the roller and the roller contact surface and the fifth axis as viewed in the direction along the first and fifth axes, a distance between the second intersection point and the first axis is maximum when the pivot angle of the first link is the reference angle.

According to the above aspect, as viewed in a direction along the first and fifth axes which are parallel to each other, the distance between the second intersection point that is the intersection of the straight line connecting the first and second axes and the straight line connecting the contact points of the roller and the roller contact surface and the fifth axis, and the distance between the second intersection point and the first axis is maximum when the pivot angle of the first link is the reference angle.

Therefore, as the pedal device in which the third link is the connecting link, the ratio of the pivot angle of the second link to the pivot angle of the first link can be maximized when the pivot angle of the first link is the reference angle. Further, as the pivot angle of the first link deviates from the reference angle, the ratio of the change amount of the pivot angle of the second link to the change amount of the pivot angle of the first link can be increased.

Other objects, other features and attendant advantages of the present disclosure will be readily understood from the description of the embodiments of the present disclosure described with reference to the following drawings.

DETAILED DESCRIPTION

Figure 1:
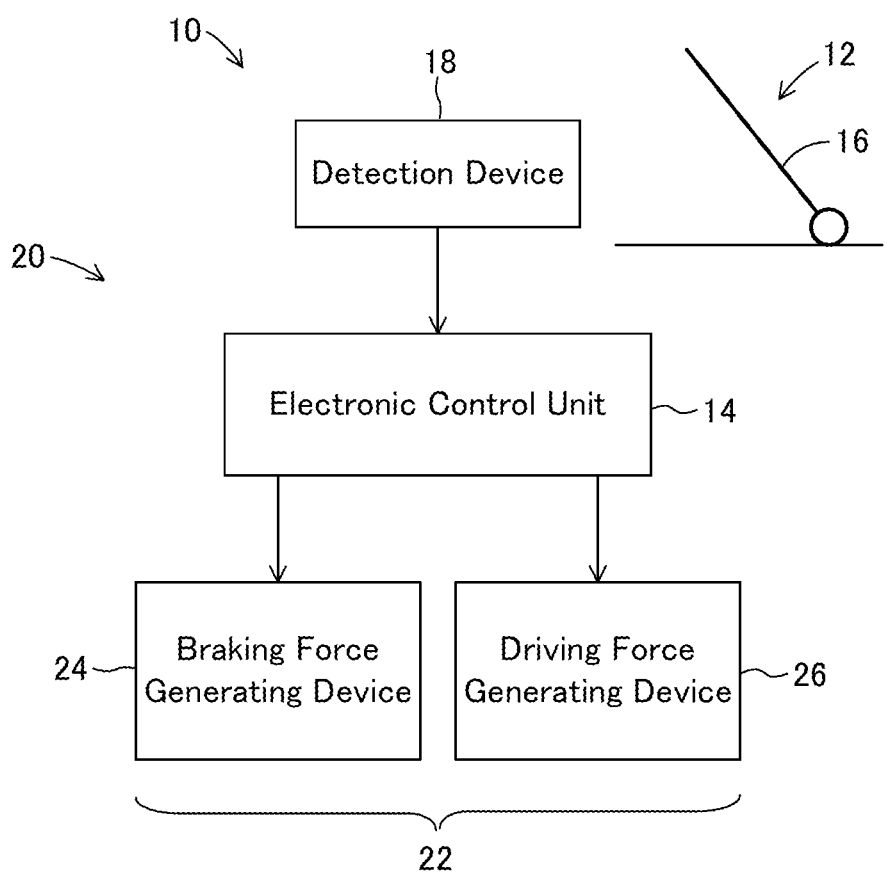
FIG. 1 is a schematic configuration diagram showing a vehicle braking/driving force control apparatus according to a first embodiment of the present disclosure.

The present disclosure will now be described in detail with reference to the accompanying drawings.

First Embodiment

The braking/driving force control apparatus 10 for a vehicle according to the first embodiment includes a pedal device 12 and an electronic control unit 14, and the electronic control unit is hereinafter abbreviated as an ECU. The pedal device 12 includes an input member 16 that is depressed by a driver not shown in the drawing, and a detection device 18 which is configured to detect an amount of depression applied to the input member. The detailed structure of the pedal device 12 will be described later with reference to FIG. 2. The ECU 14 is configured to calculate a target braking/driving force Fbdt of a vehicle 20 based on the depression amount detected by the detection device 18, and control a braking/driving force generating device 22 so that a braking/driving force Fbd of the vehicle becomes the target braking/driving force Fbdt.

The braking/driving force generating device 22 includes a braking force generating device 24 and a driving force generating device 26. When the target braking/driving force Fbdt of the vehicle 20 is a target braking force Fbt, the ECU 14 controls the braking force generating device 24 so that a braking force Fb of the vehicle 20 becomes the target braking force Fbt. On the other hand, when the target braking/driving force Fbdt of the vehicle is a target driving force Fdt, the ECU 14 controls the driving force generating device 26 so that a driving force Fd of the vehicle 20 becomes the target driving force Fdt.

Figure 2:
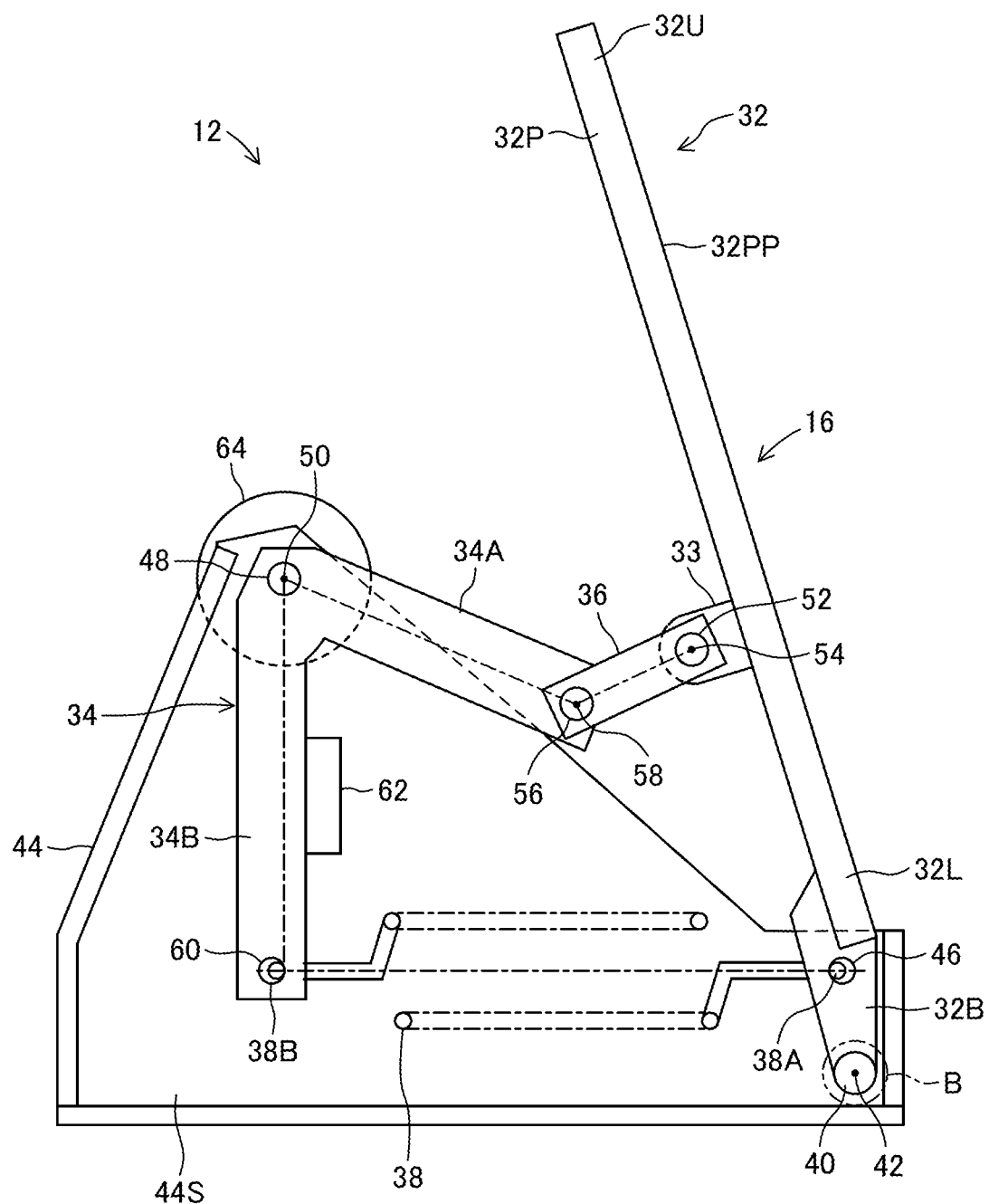
FIG. 2 is a side view showing a pedal device according to the first embodiment when first and second links are in their standard positions.

As shown in FIG. 2, the pedal device 12 in the first embodiment includes a first link 32, a second link 34, a third link 36, and a return spring 38. As will be described in detail later, the pedal device 12 is an integrated pedal device, i.e., a one-pedal type pedal device, capable of operating both a brake and an accelerator.

The first link 32 is pivotably supported at one end (the lower end as viewed in FIG. 2) 32L by a support member 44 about a first axis 42 by a pivot shaft 40 extending substantially horizontally, and functions as the input member 16.

The first link 32 extends so as to be inclined such that the other end (the upper end in FIG. 2) 32U is located on the front side (the left side in FIG. 2) of a vehicle than the one end 32L.

The support member 44 has a pair of side wall portions 44S that are spaced from each other in the direction perpendicular to the paper surface of FIG. 2. The pivot shaft 40 is integrally provided at the one end 32L and protrudes on both sides of the first link 32 along the first axis 42. The pivot shaft 40 is inserted through a pair of resin-made or metal-made bushes B inserted into holes provided in the pair of side wall portions 44S, and the pivot shaft 40 is supported by the bushes rotatably about the first axis 42.

In the illustrated first embodiment, the first link 32 includes a substantially flat plate member 32P and a bracket 32B fixed to the lower end of the plate member. The pivot shaft 40 is provided integrally with the bracket 32B, and a hole 46 into which a first end portion 38A of the return spring 38 is locked is also provided in the bracket 32B. The first link 32 is adapted to receive a pedaling force of a driver's foot on a pedaling surface 32PP which is an upper surface thereof, but may be provided with a pedal portion which projects from the plate member 32P and extends to receive the driver's foot.

The second link 34 is supported by the support member 44 by way of a pivot shaft 48 pivotably about a second axis 50 parallel to the first axis 42. The pivot shaft 48 is integrally fixed to the second link 34 and projects on both sides of the second link 34 along the second axis 50. Although not shown in FIG. 2, the pivot shaft 48 is inserted through a pair of resin-made or metal-made bushes inserted into holes provided in the pair of side wall portions 44S, and is supported by the bushes rotatably about the second axis 50.

As shown in FIG. 2, the second link 34 has first and second arm portions 34A and 34B. The first arm portion 34A is inclined downward with respect to the pivot shaft 48 and extends in a direction approaching the first link 32. The second arm portion 34B extends substantially downward with respect to the pivot shaft 48.

The third link 36 is pivotably attached to the first link 32 and the first arm portion 34A, thereby connects these members. A bracket 33 is fixed to the first link 32 between the first axis 42 and the other end 32U, and one end of the third link 36 is supported by a pivot shaft 52 fixed to the bracket 33 pivotably about a third axis 54 parallel to the first axis 42. The other end of the third link 36 is supported by a pivot shaft 56 fixed to the tip of the first arm portion 34A pivotably about a fourth axis 58 parallel to the second axis 50.

Therefore, the third link 36 is a connecting link that transmits force and displacement between the first link 32 and the first arm portion 34A of the second link 34 to pivot the second link 34 about the second axis 50. The third axis 54 may be considered as a position at which force and displacement are transmitted between the first link 32 and the second link 34.

The return spring 38 is a tension coil spring that generates a tensile force that increases as an amount of elastic deformation of extension increases. The return spring 38 is provided between the first link 32 and the lower end of the second arm portion 34B of the second link 34 in a state of being elastically extended as compared with a free state. The return spring 38 has hook-shaped first and second ends 38A and 38B. The first end 38A (the right end in FIG. 2) is locked in a hole 46 provided in the first link 32 between the first axis 42 and the third axis 54 and close to the first axis 42, and the second end 38B is locked in a hole 60 provided at the lower end of the second arm portion 34B. Therefore, the first end 38A of the return spring 38 is connected to the first link 32 between the position (the third axis 54) at which force and displacement are transmitted between the first link 32 and the third link 36 and the first axis 42. The second end 38B is connected to the second link 34 at a position spaced downward from the second axis 50.

The return spring 38 generates a return torque that biases the first link 32 and the second link 34 in the counterclockwise direction about the first axis 42 and the second axis 50, respectively. Therefore, when the first link 32 is not receiving a pedaling force at the pedaling surface 32PP, the second arm portion 34B engages with a stopper 62 provided on the one side wall portion 44S of the support member 44, whereby the first link 32, the second link 34 and the third link 36 are positioned in their standard positions shown in FIG. 2. The standard positions of the first link 32 and the second link 34 are positions where the pivot angles of the links are zero.

Figure 3:
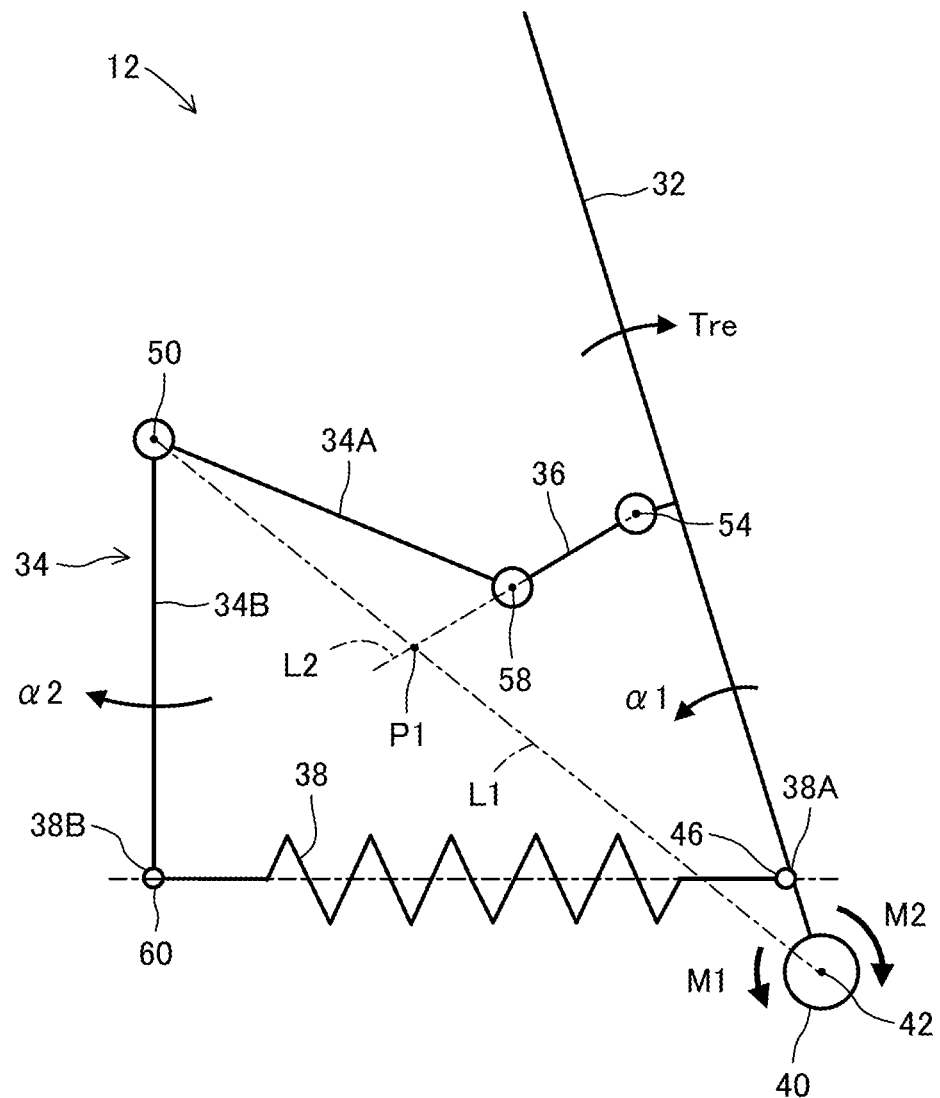
FIG. 3 is a skeleton diagram showing the pedal device according to the first embodiment.

As shown in FIG. 3, the tensile force of the return spring 38 is transmitted to the first link 32 via the first end 38A, so that a counterclockwise moment M1 acts on the first link about the first axis 42. Further, the tensile force of the return spring 38 is transmitted to the first link 32 via the second link 34 and the third link 36, so that a moment M2 in the clockwise direction acts on the first link.

The moments M1 and M2 are 0 when the first link 32 and the second link 34 are in their standard positions, but have positive values when the first link 32 and the second link 34 are at positions other than the standard positions. Furthermore, the moments M1 and M2 increase as the first link 32 pivots about the first axis 42 and the second link 34 pivots about the second axis 50.

As will be described later referring to FIG. 3, a pivot angle $\alpha 2$ of the second link 34 is larger than a pivot angle $\alpha 1$ of the first link 32. Further, a distance between the second axis 50 and the hole 60 is larger than a distance between the first axis 42 and the hole 46. Thus, as the pivot angle $\alpha 1$ of the first link 32 from the standard position increases, a distance between the first end 38A and the second end 38B of the return spring 38 increases, which in turn progressively increases the tensile force of the return spring, and thus a return torque Tre that urges the first link 32 and the second link 34 to their standard positions.

As shown in FIG. 2, a distance between the first axis 42 of the pivot shaft 40 and the third axis 54 of the pivot shaft 52 is much larger than a distance between the first axis 42 and a center of the hole 46. The moment M2 that pivots the first link 32 clockwise about the first axis 42 is larger than the moment M1 that pivots the first link 32 counterclockwise about the first axis 42. Therefore, when the first link 32 is not receiving a pedaling force at the pedaling surface 32PP, the first link 32 is also positioned in the standard position shown in FIG. 2.

The pivot shaft 48 of the second link 34 is connected to a rotation angle sensor 64, and the rotation angle sensor 64 is supported by the one side wall portion 44S. The rotation angle sensor 64 may be a rotary encoder that detects the pivot angle $\alpha 2$ of the pivot shaft 48 and the second link 34 about the second axis 50. A signal indicating the pivot angle $\alpha 2$ of the second link 34 detected by the rotation angle sensor 64 is input to the ECU 14.

Figure 7:
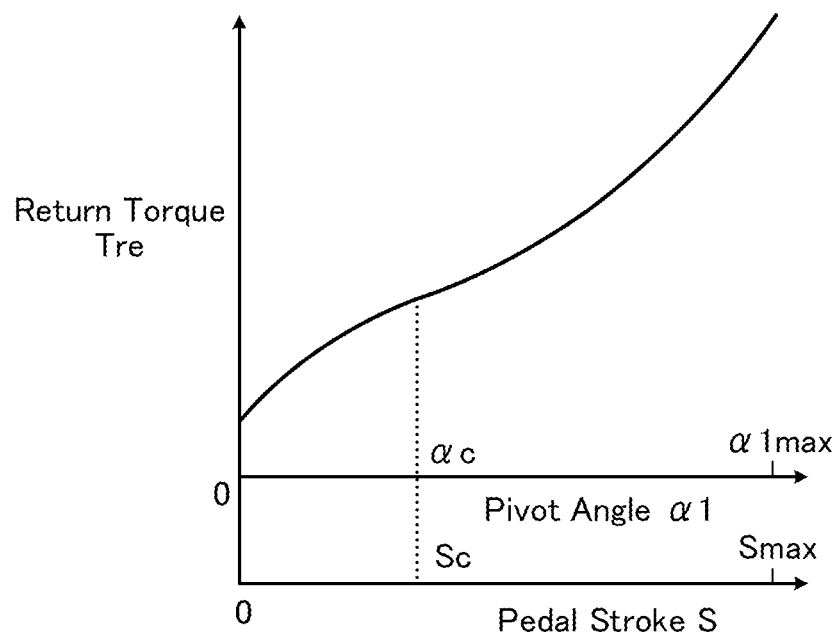
FIG. 7 is a graph showing a relationship between the pivot angle α1 of the first link and the pedal stroke S, and a return torque Tre.

Although not shown in detail in the drawing, the ECU 14 includes a microcomputer and a driving circuit, and the microcomputer has a general configuration in which a CPU, a ROM, a RAM, and an input/output port device are provided and these are connected to each other by a bidirectional common bus. In particular, the ROM of the microcomputer stores a map corresponding to the graph shown in FIG. 7 described later and a braking/driving force control program corresponding to the flowchart shown in FIG. 9. The CPU controls a braking force and a driving force of the vehicle 20 by executing the braking/driving force control program.

As shown in FIG. 3, a intersection point between a straight line L1 connecting the first axis 42 and the second axis 50 and a straight line L2 connecting the third axis 54 and the fourth axis 58 is designated as a first intersection point P1. The pedal device 12 is configured so that a distance between the first intersection point P1 and the first axis 42 is maximum when the pivot angle $\alpha 1$ of the first link 32 is a reference angle $\alpha c$ (a positive constant larger than 0 degrees and smaller than 90 degrees). The reference angle $\alpha c$ may be larger than ¼ of a maximum pivot angle $\alpha max$ of the first link 32 and smaller than ½ of the maximum pivot angle $\alpha max$. Notably, the maximum pivot angle $\alpha max$ is determined by a stopper (not shown) for the first link 32, for example.

A ratio $\alpha 2/\alpha 1$ of the pivot angle $\alpha 2$ of the second link 34 about the second axis 50 to the pivot angle $\alpha 1$ of the first link 32 about the first axis 42 is defined as a pivot angle ratio Ra. Since the pivot angle $\alpha 2$ is larger than the pivot angle $\alpha 1$, the pivot angle ratio Ra is larger than 1. A relationship between the pivot angle $\alpha 1$ and the pivot angle ratio Ra is a relationship of an upwardly curved characteristic as shown in FIG. 5.

The pivot angle ratio Ra is maximum when the pivot angle $\alpha 1$ is the reference angle $\alpha c$. Further, as the pivot angle $\alpha 1$ deviates from the reference angle $\alpha c$, a ratio of a change amount of the pivot angle $\alpha 2$ to a change amount of the pivot angle degree $\alpha 1$ increases. In other words, a slope of the curve shown in FIG. 5 increases as the pivot angle $\alpha 1$ deviates from the reference angle $\alpha c$.

Figure 5:
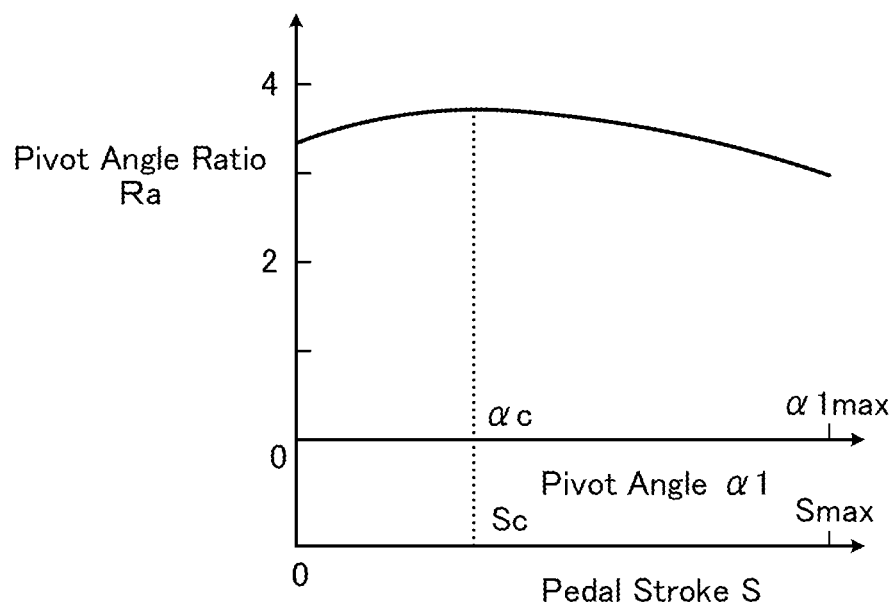
FIG. 5 is a graph showing a relationship between a pivot angle α1 of the first link and a pedal stroke S, and a ratio Ra of a pivot angle α2 of the second link to the pivot angle α1 of the first link.

The ROM of the microcomputer of the ECU 14 stores a coefficient Ks that is set based on the relationship between the pivot angle $\alpha 1$ and the pivot angle ratio Ra shown in FIG. 5 and is used when calculating a pedal stroke S of the first link 32 based on the pivot angle $\alpha 2$. Therefore, the rotation angle sensor 64 and the microcomputer of the ECU 14 functions as a detection device that detects the pivot angle $\alpha 2$ of the second link 34 about the second axis 50 to determine the pivot angle $\alpha 1$ of the first link 32 about the first axis 42 based on the pivot angle of the second link. That is, the rotation angle sensor 64 cooperates with the microcomputer of the ECU 14 to function as the detection device 18 shown in FIG. 1.

The pedal stroke S is an arc length of a locus of the other end (the upper end in FIG. 2) 32U of the first link 32, and is 0 when the first link 32 is in the standard position. Therefore, the pedal stroke S is proportional to the pivot angle $\alpha 1$ and increases as the pivot angle $\alpha 1$ increases. Sc is a pedal stroke when the pivot angle $\alpha 1$ is the reference angle $\alpha c$, that is, a reference pedal stroke. The pedal stroke may be the arc length of the locus of a position other than the other end of the first link 32.

Figure 6:
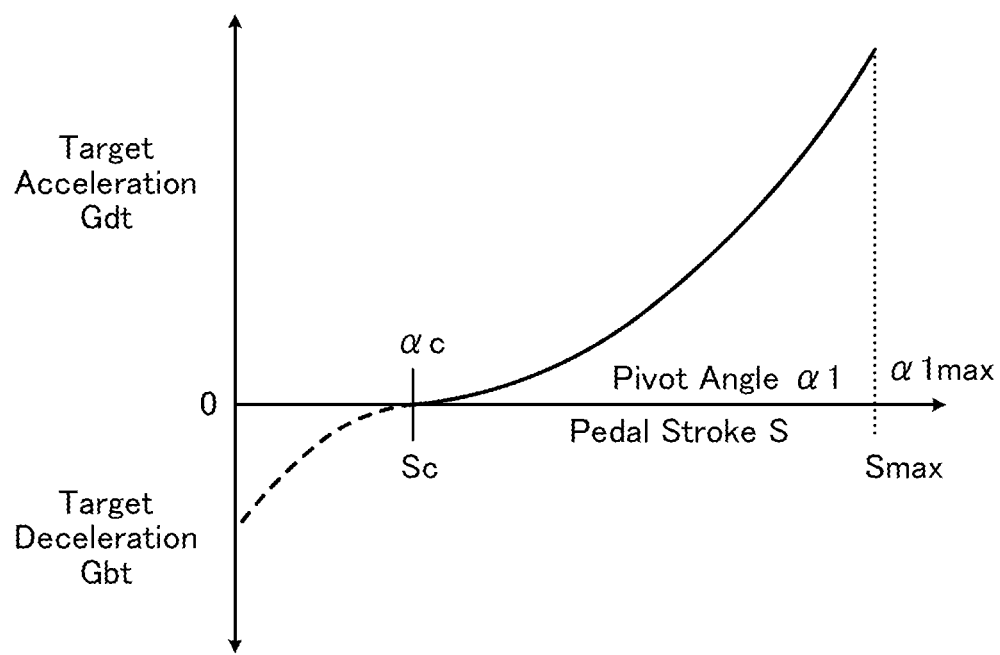
FIG. 6 is a graph showing a relationship between the pivot angle α1 of the first link and the pedal stroke S, and a target deceleration Gbt and a target acceleration Gdt of the vehicle.

Further, the ROM of the microcomputer of the ECU 14 stores a relationship between the pedal stroke S of the first link 32 and a target deceleration Gbt and a target acceleration Gdt of the vehicle 20 shown in FIG. 6. As shown in FIG. 6, when the pedal stroke S is the reference pedal stroke Sc, the target deceleration Gbt and the target acceleration Gdt are zero. The relationship stored in the ROM may be a relationship between the pivot angle $\alpha 1$ and the target deceleration Gbt and the target acceleration Gdt.

The target deceleration Gbt increases as the pivot angle $\alpha 1$ decreases in a range smaller than the reference angle $\alpha c$ and the pedal stroke S decreases in a range smaller than the reference pedal stroke Sc. Conversely, the target acceleration Gdt increases as the pivot angle $\alpha 1$ increases in a range larger than the reference angle $\alpha c$ and the pedal stroke S increases in a range larger than the reference pedal stroke Sc. Further, as the pedal stroke S decreases in the range smaller than the reference pedal stroke Sc, a ratio of a change amount of the target deceleration Gbt to a change amount of the pivot angle $\alpha 1$ and a change amount of the pedal stroke S increases. On the contrary, as the pedal stroke S increases in a range larger than the reference pedal stroke Sc, the ratio of a change amount of the target acceleration Gdt to the change amount of the pivot angle $\alpha 1$ and the change amount of the pedal stroke S increases.

As described above, the relationship between the pivot angle $\alpha 1$ and the pivot angle ratio Ra is the relationship shown in FIG. 5. The pivot angle $\alpha 2$ is a product of the pivot angle $\alpha 1$ and the corresponding pivot angle ratio Ra, and the pivot angle ratio Ra increases as the pivot angle $\alpha 1$ approaches the reference angle $\alpha c$. The distance between the first end 38A and the second end 38B of the return spring 38 increases as the pivot angle $\alpha 1$ increases, so that the return torque Tre generated by the return spring 38 also increases as the pivot angle $\alpha 1$ increases. Therefore, a relationship between the pedal stroke S and the return torque Tre is the relationship shown in FIG. 7.

<Braking/Driving Force Control>

Figure 9:
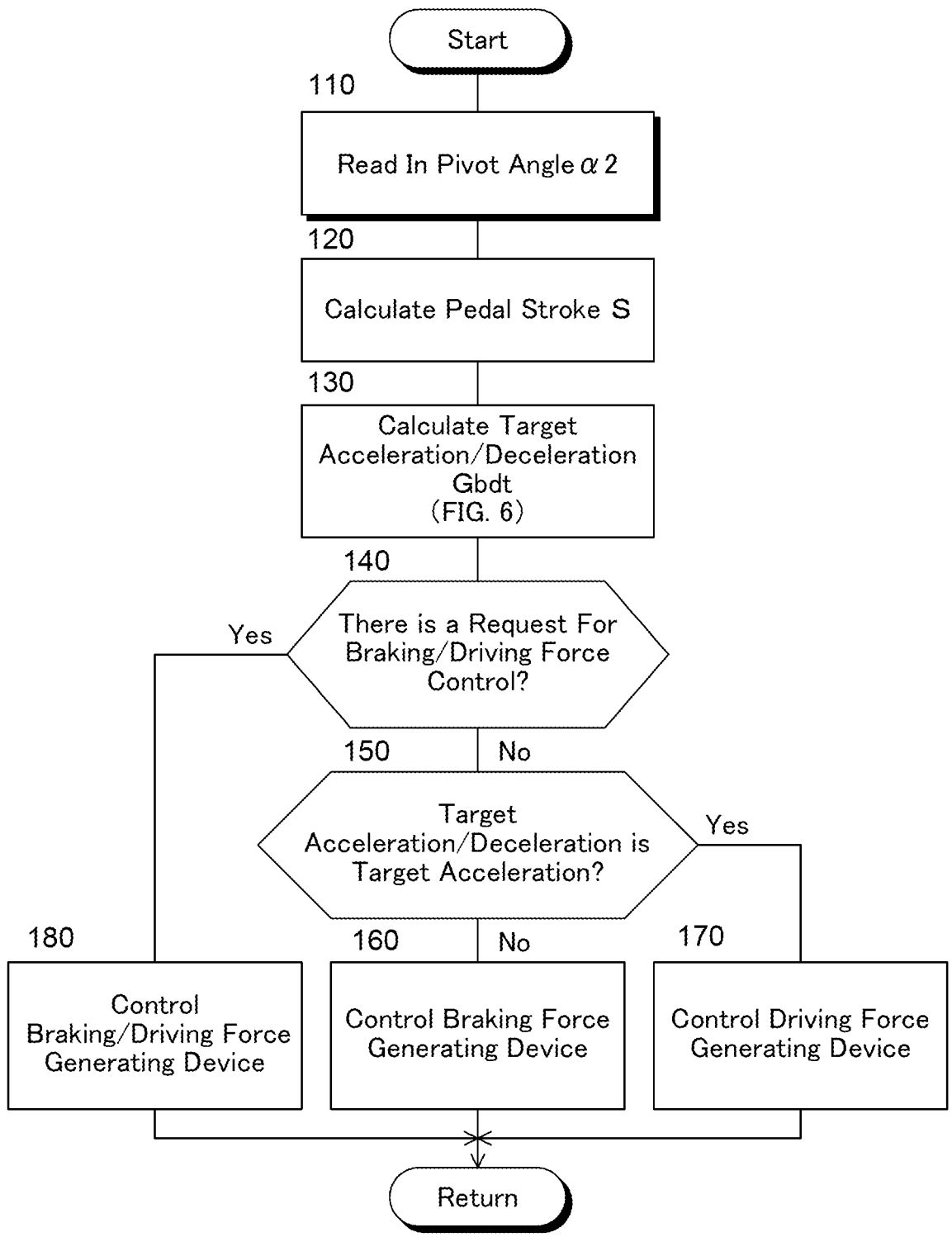
FIG. 9 is a flowchart showing a control routine of a braking/driving force of the vehicle in the first embodiment.

Next, the control routine of the braking/driving force of the vehicle in the first embodiment will be described with reference to the flowchart shown in FIG. 9. The control of the braking/driving force according to the flowchart shown in FIG. 9 is repeatedly executed at predetermined time intervals by the CPU of the microcomputer of the ECU 14 when an ignition switch (not shown) is turned on.

First, in step 110, a signal indicating the pivot angle $\alpha 2$ of the second link 34 detected by the rotation angle sensor 64 is read, and in step 120, a pedal stroke S of the first link 32 is calculated as a product of the pivot angle $\alpha 2$ and the coefficient Ks.

In step 130, a target deceleration Gbt or a target acceleration Gdt is calculated as a target acceleration/deceleration Gbdt of the vehicle 20 by referring to a map corresponding to the graph shown in FIG. 6 based on the pedal stroke S. As shown in FIG. 6, when the pedal stroke S is the reference pedal stroke Sc, the target deceleration Gbt and the target acceleration Gdt are calculated to be zero. When the pedal stroke S is smaller than the reference pedal stroke Sc, the target deceleration Gbt is calculated as the target acceleration/deceleration Gbdt of the vehicle 20, and when the pedal stroke S is larger than the reference pedal stroke Sc, the target acceleration Gdt is calculated as the target acceleration/deceleration Gbdt of the vehicle 20.

In step 140, a determination is made as to whether or not there is a request for braking/driving force control by a vehicle control such as an auto cruise control. When an affirmative determination is made, the braking/driving force control proceeds to step 180, and when a negative determination is made, the braking/driving force control proceeds to step 150.

In step 150, a determination is made as to whether or not the target acceleration/deceleration Gbdt of the vehicle 20 is the target acceleration Gdt. When an affirmative determination is made, the braking/driving force control proceeds to step 170, and when a negative determination is made, the braking/driving force control proceeds to step 160. When the target deceleration Gbt and the target acceleration Gdt are 0, it may be determined that the target acceleration/deceleration Gbdt is the target acceleration Gdt.

In step 160, a target braking force of each wheel is calculated on the basis of the target deceleration Gbt in a manner known in the art, and the braking force generating device 24 of the braking/driving force generating device 22 is controlled so that the braking force of each wheel becomes the corresponding target braking force. Therefore, a deceleration of the vehicle 20 is controlled to be the target deceleration Gbt.

In step 170, a target driving force of the driving force generating device 26 of the braking/driving force generating device 22 is calculated based on the target acceleration Gdt in a manner known in the art, and the driving force generating device 26 is controlled so that a driving force of the driving force generating device 26 becomes the target driving force. Therefore, an acceleration of the vehicle 20 is controlled to be the target acceleration Gdt.

In step 180, the braking force generating device 24 and the driving force generating device 26 of the braking/driving force generating device 22 are controlled so that an acceleration/deceleration of the vehicle 20 becomes a target acceleration/deceleration of the braking/driving force control by the vehicle control.

Second Embodiment

Figure 4:
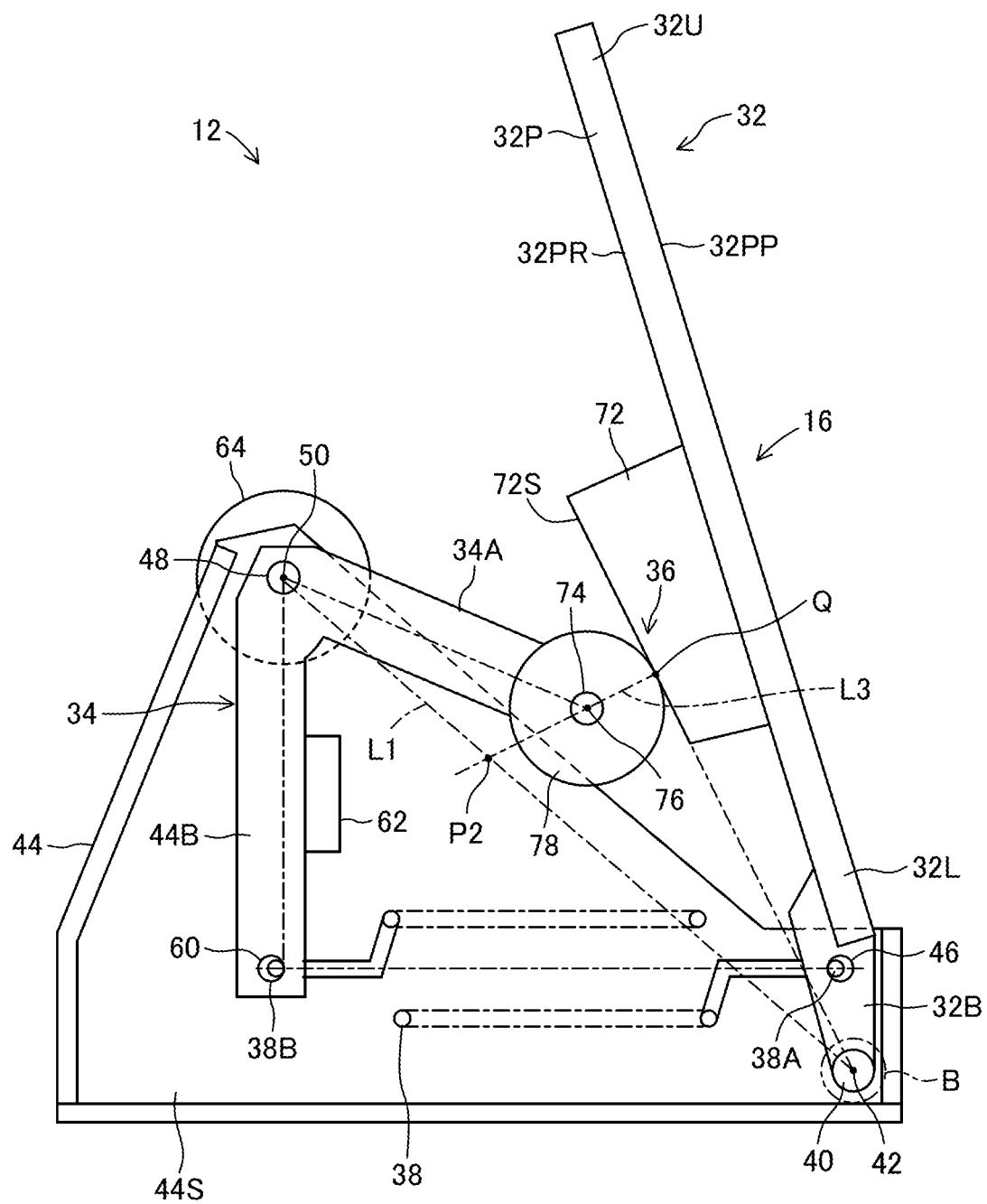
FIG. 4 is a side view showing the pedal device according to the second embodiment, when the first and second links are in their standard positions.

FIG. 4 is a side view showing a pedal device in a second embodiment of the vehicle braking/driving force control device according to the present disclosure. In FIG. 4, the same members as those shown in FIG. 2 are designated by the same reference numerals as those shown in FIG. 2.

In the second embodiment, the first link 32 is configured similarly to the first link 32 in the first embodiment, but the third link 36 which is the connecting link in the first embodiment is not provided. A roller contact member 72 having a roller contact surface 72S is fixed to the lower surface 32PR on the side opposite to the pedaling surface 32PP.

A roller support shaft 74 is integrally provided at the tip of the first arm portion 34A of the second link 34, and an axis 76 (a fifth axis) of the roller support shaft extends parallel to the second axis 50. The roller support shaft 74 supports a roller 78 rotatably about the fifth axis 76, and a surface of the roller 78 extends in a cylindrical shape about the fifth axis 76, and is in contact with the roller contact surface 72S of the roller contact member 72.

The second link 34 is biased in the counterclockwise direction about the second axis 50 by the tensile force of the return spring 38 as in the first embodiment, so that the roller 78 is pressed against the roller contact surface 72S by the second link 34. Therefore, when the first link 32 pivots about the first axis 42, the roller 78 rolls in contact with the roller contact surface 72S.

Therefore, the roller contact member 72 and the roller 78 cooperate with each other to function as a third link 36 for transmitting force and displacement between the first link 32 and the second link 34, similarly to the third link 36 in the first embodiment. Further, a contact point Q between the roller 78 and the roller contact surface 72S is a position at which force and displacement are transmitted between the first link 32 and the second link 34.

As shown in FIG. 4, an intersection of a straight line L1 connecting the first axis 42 and the second axis 50 and a straight line L3 connecting the contact point Q and the fifth axis 76 is defined as a second intersection P2. The pedal device 12 is configured such that a distance between the second intersection P2 and the first axis 42 is maximum when the pivot angle $\alpha 1$ of the first link 32 is the reference angle $\alpha c$.

Therefore, also in the second embodiment, the relationship between the pivot angle $\alpha 1$ and the pivot angle ratio Ra is the relationship of the upwardly curved characteristic as shown in FIG. 5. The pivot angle ratio Ra is greater than 1 and is maximum when the pivot angle $\alpha 1$ is the reference angle $\alpha c$. Further, as the pivot angle $\alpha 1$ deviates from the reference angle $\alpha c$, the ratio of the change amount of the pivot angle $\alpha 2$ to the change amount of the pivot angle $\alpha 1$ increases.

It is to be noted that the reference angle $\alpha c$ may be a value different from the reference angle $\alpha c$ in the first embodiment as long as it is a positive constant larger than 0 degrees and smaller than 90 degrees. Also in the second embodiment, the reference angle $\alpha c$ may be larger than ¼ of the maximum pivot angle $\alpha max$ of the first link 32 and smaller than ½ of the maximum pivot angle $\alpha max$.

In the illustrated embodiment, the roller contact surface 72S extends parallel to the first axis 42 and along the straight line connecting the contact point Q and the first axis 42 when the first link 32 and the second link 34 are in their standard position. Therefore, an angle formed by the straight line L3 with respect to the roller contact surface 72S is 90 degrees. This angle is always 90 degrees, no matter how the pivot angle $\alpha 1$ of the first link 32 about the first axis 42 changes and the pivot angle $\alpha 2$ of the second link 34 about the second axis 50 changes. Accordingly, the transmission of force and displacement between the first link 32 and the roller 68 is always efficient.

The roller contact surface 72S may have a planar shape extending obliquely with respect to the straight line connecting the contact Q and the first axis 42 when the first link 32 and the second link 34 are in their standard positions or may be a curved surface. Also in those cases, the angle formed by the straight line L3 connecting the contact Q and the fifth axis 76 with respect to the roller contact surface 72S at the contact Q is always 90 degrees.

The other points of the pedal device 12 and the ECU 14 are configured similarly to those in the first embodiment. The ECU 14 is configured to calculate a target braking/driving force Fbdt of the vehicle 20 based on an depressing amount detected by the detection device 18, and control the braking/driving force generating device 22 so that a braking/driving force Fbd of the vehicle becomes the target braking/driving force Fbdt.

Effects of the Embodiment

According to the first and second embodiments, the target acceleration/deceleration Gbdt of the vehicle 20 is zero when the pivot angle $\alpha 1$ of the first link 32 is the preset reference angle $\alpha c$. Further, the target deceleration Gbt of the vehicle is calculated according to the pivot angle $\alpha 1$ such that in a range where the pivot angle $\alpha 1$ is smaller than the reference angle $\alpha c$, the smaller the pivot angle $\alpha 1$ is, the larger the target deceleration Gbt of the vehicle is, and in the range where the pivot angle $\alpha 1$ is larger than the reference angle $\alpha c$, the larger the pivot angle $\alpha 1$ is, the larger the target acceleration Gdt of the vehicle is.

The ECU 14 controls the acceleration/deceleration Gbd of the vehicle 20 to be the target acceleration/deceleration Gbdt. Therefore, the acceleration/deceleration of the vehicle is zero when the pivot angle $\alpha 1$ of the first link 32 is the reference angle $\alpha c$. Further, the acceleration/deceleration Gbd of the vehicle 20 is controlled according to the pivot angle $\alpha 1$ such that in the range where the pivot angle $\alpha 1$ is smaller than the reference angle $\alpha c$, the deceleration Gb of the vehicle increases as the pivot angle $\alpha 1$ decreases, and in the range where the pivot angle $\alpha 1$ is larger than the reference angle $\alpha c$, as the angle $\alpha 1$ increases, the acceleration Gd of the vehicle increases. Therefore, it is possible to change the change amount of the acceleration/deceleration of the vehicle with respect to the change amount of the pivot angle $\alpha 1$ of the first link, that is, the amount of change in the pedal stroke S.

Further, according to the first and second embodiments, the pedal device 12 is configured so that the ratio Ra of the pivot angle $\alpha 2$ of the second link 34 to the pivot angle $\alpha 1$ of the first link 32 is maximum when the pivot angle $\alpha 1$ of the first link 32 is the reference angle $\alpha c$. Therefore, even if the pivot angle $\alpha 1$ of the first link increases at a constant rate of increase, as the pivot angle $\alpha 1$ increases in the process in which the pivot angle $\alpha 1$ increases in a range smaller than the reference angle $\alpha c$, the rate of increase of the pivot angle $\alpha 2$ of the second link 34 increases. Conversely, even if the pivot angle $\alpha 1$ increases at a constant rate of increase, as the pivot angle $\alpha 1$ increases in the process in which the pivot angle $\alpha 1$ increases in a range larger than the reference angle $\alpha c$, the rate of increase of the pivot angle $\alpha 2$ of the second link 34 decreases.

The return spring 38 is the tension coil spring, which is connected to the first link 32 at one end and is connected at the other end to the second arm portion 34B of the second link 34 at a position spaced from the second axis 50. Therefore, the relationship between the pivot angle $\alpha 1$ of the first link 32 and the return torque Tre generated by the return spring 38 has the non-linear relationship shown in FIG. 7. Therefore, the return torque Tre changes nonlinearly according to the change in the pivot angle $\alpha 1$ of the first link 32.

That is, even if the pivot angle $\alpha 1$ of the first link 32 increases at a constant increase rate, in the process in which the pivot angle $\alpha 1$ increases in a range smaller than the reference angle $\alpha c$, an increase rate of the return torque Tre decreases as the pivot angle $\alpha 1$ increases. Conversely, even if the pivot angle $\alpha 1$ increases at a constant rate of increase, in the process in which the pivot angle $\alpha 1$ increases in a range larger than the reference angle $\alpha c$, the increase rate of the return torque Tre increases as the pivot angle $\alpha 1$ increases.

Therefore, as compared with a conventional case in which the increase rate of the return torque changes substantially linearly according to the change of the pivot angle of the first link, the relationship between the return torque and the acceleration/deceleration of the vehicle, and thus the relationship between a pedal reaction force Fre and the acceleration/deceleration of the vehicle can be approximated to a linear relationship. Accordingly, the acceleration/deceleration of the vehicle can be increased/decreased as linearly as possible with respect to the increase/decrease of the pedal reaction force Fre.

In particular, in the first and second embodiments, the return spring 38 is arranged so as to generate a return torque Tre that changes according to the pivot angles $\alpha 1$ and $\alpha 2$ of the first and second links 32 and 34 such that the ratio of the change amount of the deceleration Gb of the vehicle to the change amount of the pedal reaction force Fre is constant, and the ratio of the change amount of the vehicle acceleration Gd to the change amount of the pedal reaction force Fre is constant.

Figure 8:
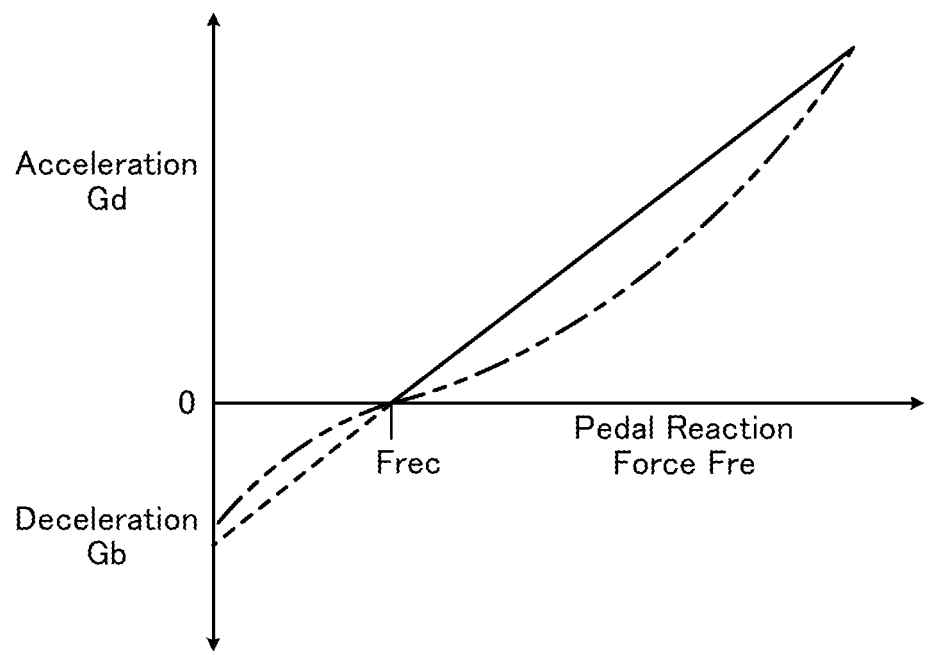
FIG. 8 is a graph showing a relationship between a pedal reaction force Fre and a deceleration Gb and an acceleration Gd of the vehicle.

As a result, the return torque Tre that changes depending on the pivot angles $\alpha 1$ and $\alpha 2$ of the first and second links 32 and 34 can be generated such that the ratio of the change amount of the deceleration Gb of the vehicle 20 to the change amount of the pedal reaction force Fre is constant, and the ratio of the change amount of the acceleration Gd of the vehicle 20 to the change amount of the pedal reaction force Fre is constant. Therefore, as shown in FIG. 8, the acceleration/deceleration Gbd of the vehicle 20 can be linearly related to the increase/decrease of the pedal reaction force Fre, and the deceleration Gb and the acceleration Gd of the vehicle 20 can be linearly increased/decreased with respect to the increase/decrease of the pedal reaction force Fre. In FIG. 8, Frec is the pedal reaction force when the pivot angle α1 of the first link 32 is the reference angle αc and the pedal stroke S is the reference pedal stroke Sc.

The phantom line in FIG. 8 indicates a relationship between a pedal reaction force Fre and a deceleration Gb and an acceleration Gd of a vehicle for a conventional pedal device in which the relationship between the pivot angle α1 of the first link and the return torque Tre is linear. In the conventional pedal device, when the pivot angle α1 of the first link is a value in a range at and near the reference angle αc, the ratio of the change amount of the deceleration Gb of the vehicle and the change amount of the acceleration Gd to the change amount of the pedal reaction force Fre is smaller than when the pivot angle α1 is a value in another range. Therefore, it is not easy for a driver to adjust a pedaling force on the first link so that the pivot angle α1 of the first link 32 becomes the reference angle αc, in other words, the pedal stroke S becomes the reference pedal stroke Sc.

On the other hand, according to the first and second embodiments, the ratio of the change amount of the deceleration Gb of the vehicle 20 and the change amount of the acceleration Gd of the vehicle to the change amount of the pedal reaction force Fre is the same even when the pivot angle α1 of the first link 32 is a value near the reference angle αc as when the pivot angle α1 of the first link is a value in the another range. Therefore, when the driver does not want to accelerate or decelerate the vehicle 20, it is easier for the driver to adjust the pedaling force on the first link 32 so that the pedal stroke S becomes the reference pedal stroke Sc as compared with the conventional pedal device.

According to the first and second embodiments, as shown in FIG. 5, as the pivot angle α1 of the first link 32 deviates from the reference angle αc, the ratio of the change amount of the pivot angle α2 of the second link 34 to the change amount of the pivot angle α1 increases. Further, the target acceleration/deceleration Gbdt of the vehicle 20 is calculated according to the pivot angle α1 such that, as shown in FIG. 6, as the pivot angle α1 becomes smaller within a range smaller than the reference angle αc, the ratio of the change amount of the target deceleration Gbt of the vehicle to the change amount of the pivot angle α1 increases, and as the pivot angle α1 increases in a range larger than the reference angle αc, the ratio of the change amount of the target acceleration Gdt of the vehicle to the change amount of the pivot angle α1 increases.

Therefore, the ratio of the change amount of the target deceleration Gbt of the vehicle 20 to the change amount of the pivot angle α1 can be set so that in a range in which the pivot angle α1 of the first link is smaller than the reference angle αc, the smaller the pivot angle α1 is, the larger the ratio is. Further, the ratio of the change amount of the target acceleration Gdt of the vehicle 20 to the change amount of the pivot angle α1 can be set so that in a range in which the pivot angle α1 of the first link is larger than the reference angle αc, the larger the pivot angle α1 is, the larger the ratio is.

Thus, the ratio of the change amount of the acceleration/deceleration Gbd of the vehicle 20 to the change amount of the pedal stroke S can be set to a ratio in the one-pedal type pedal device. That is, the ratio of the change amount of the deceleration Gb of the vehicle 20 to the change amount of the pedal stroke S can be increased as the pedal stroke is smaller. Further, the ratio of the change amount of the acceleration Gd of the vehicle 20 to the change amount of the pedal stroke S can be increased as the pedal stroke increases.

According to the first and second embodiments, the rotation angle sensor 64 detects a pivot angle α2 of the second link 34 about the second axis 50, and the ECU 14 determines the pivot angle α1 of the first link 32 about the first axis 42 based on the pivot angle α2 of the second link 34. Therefore, the pivot angle α1 of the first link 32 can be obtained by detecting the pivot angle α2 of the second link 34. Further, since it is not necessary to detect the pivot angle α1 of the first link 32, it is possible to simplify the structure around the first link that is depressed by a driver.

According to the first and second embodiments, the reference angle αc is a value that is larger than ¼ of the maximum pivot angle αmax of the first link 32 and smaller than ½ of the maximum pivot angle αmax. Therefore, a ratio of a braking range to the entire range of the pedal stroke S can be made larger than ¼ and smaller than ½.

According to the first and second embodiments, as shown in FIG. 5, the ratio Ra of the pivot angle α2 of the second link 34 to the pivot angle α1 of the first link 32 is greater than 1. Therefore, since the tensile force of the return spring 38 increases as the pivot angle α1 of the first link 32 increases, the return torque Tre that returns the first link to the standard position can be increased.

In particular, according to the first embodiment, the third link 36 is a connecting link pivotably attached to the first link 32 at one end and pivotably attached to the second link 34 at the other end. Thus, the connecting link can transmit the force and displacement between the first link 32 and the second link 34, causing the second link to pivot about the second axis 50 in the direction opposite to that of the first link.

According to the first embodiment, the first to fourth axes 42, 50, 54 and 58 are parallel to each other. When viewed in a direction along the first to fourth axes, a first intersection point P1 is defined as an intersection point of the straight line L1 connecting the first and second axes 42 and 50 and the straight line L2 connecting the third and fourth axes 54 and 58. The distance between the first intersection point P1 and the first axis 42 is maximum when the pivot angle α1 of the first link 32 is the reference angle αc.

Therefore, as shown in FIG. 5, when the pivot angle α1 of the first link 32 is the reference angle αc, the ratio Ra of the pivot angle α2 of the second link 34 to the pivot angle α1 can be maximized. In addition, as the pivot angle α1 of the first link 32 deviates from the reference angle αc, the ratio of the change amount of the pivot angle α2 of the second link 34 to the change amount of the pivot angle α1 can be increased.

Further, according to the second embodiment, when the first link 32 pivots about the first axis 42, the roller 78, which rotatably supported by the second link 34 about the fifth axis 76 parallel to the second axis 50, rolls in contact with the roller contact surface 72S of the roller contact member 72 fixed to the first link 32.

Therefore, the roller 78 and the roller contact surface 72S cooperates with each other to function as a third link that transmits force and displacement between the first link 32 and the second link 34, and can pivot the second link 34 about the second axis 50 in a direction opposite to that of the first link 32.

Further, according to the second embodiment, the first, second and fifth axes 42, 50 and 76 are parallel to each other. When viewed in a direction along the first, second and fifth axes, an intersection point of the straight line L1 connecting the first and second axes 42 and 50 and the straight line L3 connecting the contact point Q between the roller 78 and the roller contact surface 72S and the fifth axis 76 is defined as the second intersection point P2. The distance between the second intersection point P2 and the first axis 42 is maximum when the pivot angle α1 of the first link 32 is the reference angle αc.

Therefore, similarly to the first embodiment in which the third link 36 is the connecting link, when the pivot angle α1 of the first link 32 is the reference angle αc, the ratio Ra of the pivot angle α2 of the second link 34 to the pivot angle α1 can be maximized. In addition, as the pivot angle α1 of the first link 32 deviates from the reference angle αc, the ratio of the change amount of the pivot angle α2 of the second link 34 to the change amount of the pivot angle α1 can be increased.

Further, according to the first and second embodiments, when the first link 32 is pivoted about the first axis 42, a pedaling force is applied to the first link by a driver so that a force that overcomes a force transmitted from the return spring 38 to the first link 32 via the second link 34 and the third link 36 acts on the third link from the first link. On the other hand, the force transmitted to the first link 32 via the first end portion 38A is not influenced by the pedaling force applied to the first link by the driver.

As a result, a force component along the straight line (not shown) connecting the first axis 42 and the other end 38B of the return spring 38 is generated by the force transmitted to the first link 32 via the first end 38A. This force component keeps the pivot shaft 40 and a surface of the hole of the bush B supporting it in a pressed state. Therefore, when the first link 32 is pivoted, it is possible to prevent the first link from rattling due to a relative displacement of the pivot shaft 40 in a direction perpendicular to the first axis 42 with respect to the hole supporting it.

Thus, the return spring 38 achieves both the function of urging the first link 32 to the standard position and the function of keeping the pivot shaft 40 and the surface of the hole that supports it pressed to each other to prevent the first link 32 from rattling. Therefore, it is not necessary to separately provide techniques for preventing rattling of the first link 32 in addition to the return spring 38, and thus the rattling can be prevented for a long period of time without complicating the structure and increasing the cost.

Although the present disclosure has been described in detail with reference to specific embodiments, it will be apparent to those skilled in the art that the present disclosure is not limited to the above-described embodiments, and various other embodiments are possible within the scope of the present disclosure.

For example, in the above-described first and second embodiments, the first end 38A of the return spring 38 is connected to the first link 32 between the first axis 42 and the position at which force and displacement are transmitted between the first link 32 and the third link 36. However, the first end 38A of the return spring 38 may be connected to the support member 44, but, in that case, the spring force of the return spring 38 cannot prevent the rattling of the first link 32 as in the embodiments.

Further, in the above-described first and second embodiments, the return spring 38 is a tension coil spring, but may be any spring such as a rubber-like elastic material as long as the return spring 38 generates a tensile force that increases as the amount of extensional deformation increases.

Further, in the above-described first and second embodiments, the pivot angle α2 of the second link 34 about the second axis 50 is detected by the rotation angle sensor 64 and the pivot angle α1 of the first link 32 about the first axis 42 is calculated based on the pivot angle α2. However, the pivot angle α1 of the first link 32 may be detected by a rotation angle sensor that detects the rotation angle of the pivot shaft 40, for example.

Further, in the above-described first and second embodiments, the pivot shaft 40 is integrally provided at the one end 32L of the first link 32 and is inserted into a pair of bushes B inserted into holes provided in the pair of side wall portions 44S of the support member 44, and is supported rotatably about the first axis 42 by the bushes. However, the pivot shaft 40 may be inserted into the holes provided in the pair of side wall portions 44S without the intervention of any bush.

Further, a bush may be attached to the one end 32L of the first link 32, and the pivot shaft 40 may be fixed to at least one of the pair of side wall portions 44S while being inserted into the bush. In that case, the support member 44 may have only one side wall portion 44S, and the pivot shaft 40 may be supported by the side wall portion 44S in a cantilever manner.

Further, although the pedal device 12 is an organ type pedal device in the above-described first and second embodiments, the pedal device 12 may be a pendant type pedal device having the above-mentioned features.

What is claimed is:

1. A braking/driving force control apparatus for a vehicle including
a pedal device having an input member depressed by a driver and a detection device configured to detect a depressing amount applied to the input member, and
an electronic control unit that is configured to calculate a target acceleration/deceleration of the vehicle based on the depressing amount detected by the detection device, and control a braking/driving force generation device so that an acceleration/deceleration of the vehicle becomes the target acceleration/deceleration, wherein
the pedal device includes a first link pivotably supported by a support member so as to be pivotable about a first axis and functioning as the input member, a second link supported pivotably about a second axis by the support member, a third link that is configured to pivot the second link about the second axis by transmitting force and displacement between the first link and the second link, and a return spring that generates a return torque about the first axis that biases the first link toward a standard position at which a pivot angle of the first link is zero, and is configured such that a ratio of a pivot angle of the second link to the pivot angle of the first link is maximum when the pivot angle of the first link is a preset reference angle,
the return spring is a tension spring that is connected at one end to one of the first link and the support member and is connected at the other end to the second link at a position spaced from the second axis, and
the electronic control unit is configured to calculate a target acceleration/deceleration of the vehicle according to the pivot angle of the first link, so that when the pivot angle of the first link is the reference angle, the target acceleration/deceleration of the vehicle is zero; in a range in which the pivot angle of the first link is smaller than the reference angle, the target deceleration of the vehicle increases as the pivot angle of the first link decreases; and in a range where the pivot angle of the first link is larger than the reference angle, the target acceleration of the vehicle increases as the pivot angle of the first link increases.

2. The braking/driving force control apparatus for a vehicle according to claim 1, wherein the pedal device is configured such that as the pivot angle of the first link deviates from the reference angle, a ratio of a change amount of the pivot angle of the second link to a change amount of the pivot angle of the first link becomes larger, and the electronic control unit is configured to calculate the target acceleration/deceleration of the vehicle according to the pivot angle of the first link such that as the pivot angle of the first link decreases in a range smaller than the reference angle, a ratio of a change amount of the target deceleration of the vehicle to the change amount of the pivot angle of the first link increases, and as the pivot angle of the first link increases in a range larger than the reference angle, a ratio of a change amount of the target acceleration of the vehicle to the change amount of the pivot angle of the first link increases.

3. The braking/driving force control apparatus for a vehicle according to claim 2, wherein the return spring is configured to generate a return torque that changes according to the pivot angles of the first and second links such that a ratio of a change amount of the deceleration of the vehicle to a change amount of a reaction force of the pedal device becomes constant, and a ratio of a change amount of the acceleration of the vehicle to the change amount of the reaction force of the pedal device becomes constant.

4. The braking/driving force control apparatus for a vehicle according to claim 1, wherein the detection device is configured to detect the pivot angle of the second link about the second axis, and the electronic control unit is configured to determine the pivot angle of the first link about the first axis based on the pivot angle of the second link.

5. The braking/driving force control apparatus for a vehicle according to claim 1, wherein the reference angle is larger than ¼ of a maximum pivot angle of the first link and smaller than ½ of the maximum pivot angle of the first link.

6. The braking/driving force control apparatus for a vehicle according to claim 1, wherein the pedal device is configured such that a ratio of the pivot angle of the second link to the pivot angle of the first link is larger than 1.

7. The braking/driving force control apparatus for a vehicle according to claim 1, wherein the third link is a connection link that is connected at one end to the first link pivotably about a third axis and is connected at the other end to the second link pivotably about a fourth axis.

8. The pedal device for a vehicle according to claim 7, wherein the first to fourth axes are parallel to each other, and the pedal device is configured such that, with a first intersection point being defined as an intersection point between a straight line connecting the first and second axes and a straight line connecting the third and fourth axes as viewed in a direction along the first to fourth axes, a distance between the first intersection and the first axis is maximum when the pivot angle of the first link is the reference angle.

9. The braking/driving force control apparatus for a vehicle according to claim 1, wherein the third link includes a roller supported by the second link rotatably about a fifth axis parallel to the second axis and a roller contact surface provided on the first link, and the roller is configured to roll in contact with the roller contact surface when the first link pivots about the first axis.

10. The braking/driving force control apparatus for a vehicle according to claim 9, wherein the first and fifth axes are parallel to each other, and the pedal device is configured such that, with a second intersection point being defined as an intersection of a straight line connecting the first and second axes and a straight line connecting a contact point of the roller and the roller contact surface and the fifth axis as viewed in the direction along the first and fifth axes, a distance between the second intersection point and the first axis is maximum when the pivot angle of the first link is the reference angle.

* * * * *